May 27, 1958 P. E. BESSIERE 2,836,742
FOUCAULT CURRENT BRAKING DEVICES
Filed Oct. 5, 1954 4 Sheets-Sheet 1
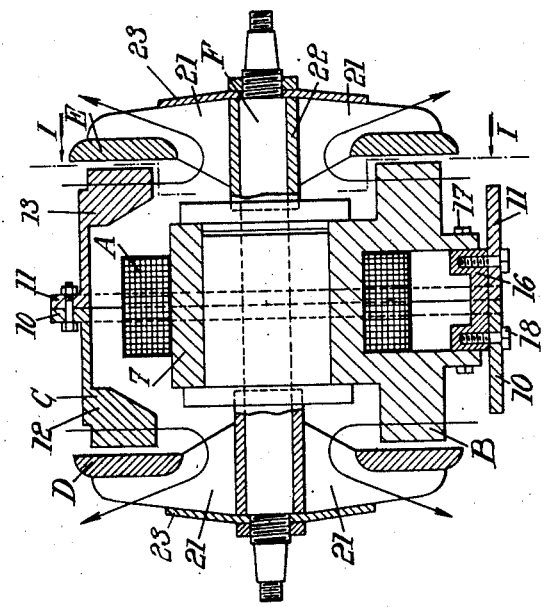
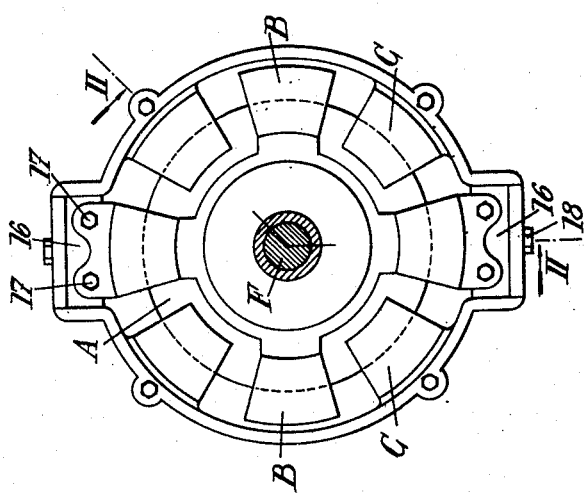
INVENTOR
Pierre Étienne Bessiere
BY
Bailey, Stephens & Huettig
ATTORNEYS May 27, 1958 P. E. BESSIERE 2,836,742
FOUCAULT CURRENT BRAKING DEVICES
Filed Oct. 5, 1954 4 Sheets-Sheet 2
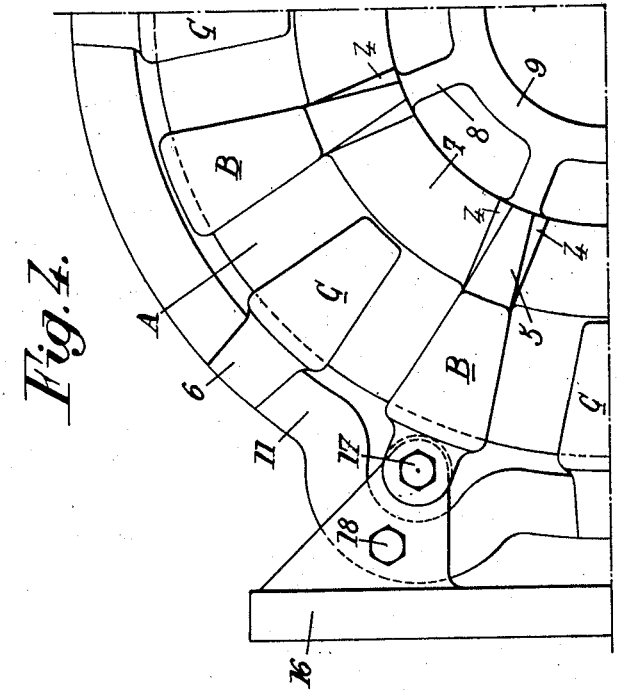
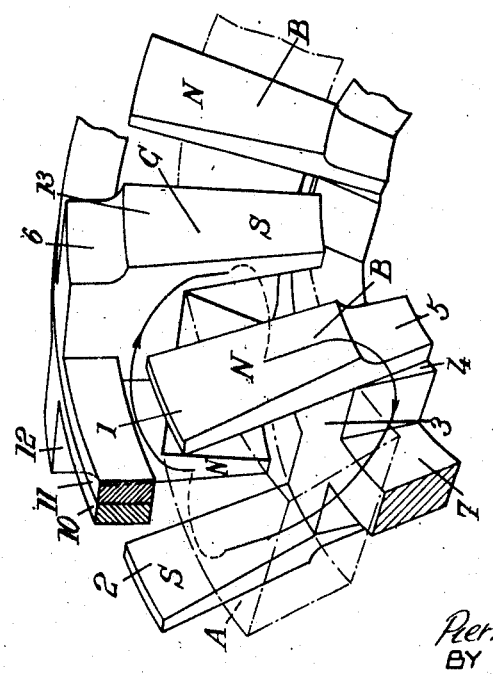
INVENTOR
Pierre Etienne Bessiere
BY
Bailey, Stephens & Huettig
ATTORNEYS May 27, 1958 P. E. BESSIERE 2,836,742
FOUCAULT CURRENT BRAKING DEVICES
Filed Oct. 5, 1954 4 Sheets-Sheet 3
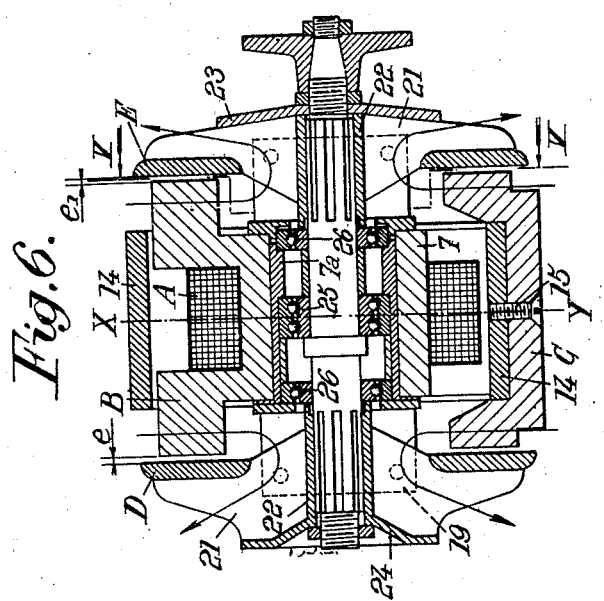
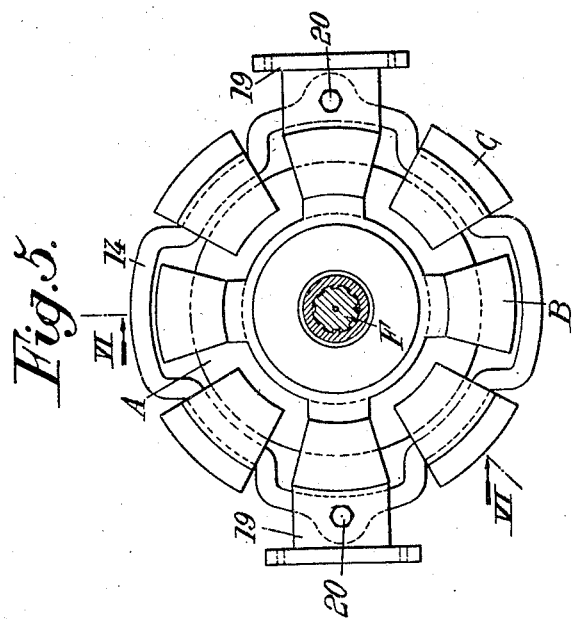
INVENTOR
Pierre Etienne Bessiere
BY
Bailey, Stephens & Huettig
ATTORNEYS May 27, 1958  P. E. BESSIERE  2,836,742
FOUCAULT CURRENT BRAKING DEVICES
Filed Oct. 5, 1954  4 Sheets-Sheet 4

PIERRE ETIENNE BESSIERE
INVENTOR

BY
Bailey, Stephens & Huettig
ATTORNEYS

United States Patent Office 2,836,742
Patented May 27, 1958

2,836,742

FOUCAULT CURRENT BRAKING DEVICES

Pierre Etienne Bessiere, Paris, France, assignor to Compagnie Telma, Paris, France Application October 5, 1954, Serial No. 460,463

Claims priority, application France October 16, 1953

13 Claims. (Cl. 310—93)

The present invention concerns Foucault current braking devices, that is to say devices in which the slowing down effect is obtained by producing Foucault currents in a conductive mass rigid with the part to be braked and moving in a magnetic field created by at least one electromagnet.

My invention is concerned with devices of this kind in which the stator includes an inductor system disposed between two rotating metal discs which constitute the rotor in which the Foucault currents are produced.

The chief object of my invention is to provide a device of this kind which is better adapted to meet the requirements of practice than those known at the present time, in particular to improve cooling, to balance the stresses due to expansion and to simplify the stator construction while increasing its efficiency.

Figs. 1 and 2 are respectively an elevational view partly in section on the line I—I of Fig. 2 and an axial sectional view on the line II—II of Fig. 1 of a braking device made according to a first embodiment of my invention.

Fig. 3 is a perspective view showing a portion of a device of the same kind but of slightly different construction.

Fig. 4 is an elevational view corresponding to the construction of Fig. 3, showing a portion of the stator of a braking device according to my invention.

Figs. 5 and 6 are views similar to Figs. 1 and 2 and showing another embodiment of the invention, respectively in section on the line V—V of Fig. 6 and on the line VI—VI of Fig. 5.

Figure 7:
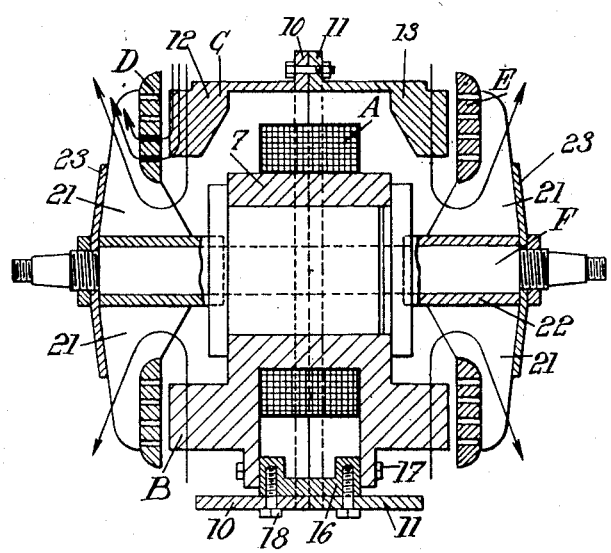
Fig. 7 is a view similar to Fig. 2 and showing a modification.

The inductor unit of the stator of my device is advantageously constituted by a single annular or toroidal coil such as A and by magnetic annular elements 7 and 10—11 carrying a plurality of U-shaped members B and C disposed on opposite side of coil A. U-shaped members B, which include pole pieces 1 and 2, are carried by the annular magnetic core element 7 located on the inner cylindrical face of coil A and their branches, which constitute the pole pieces 1, 2, extend radially along the sides of said coil A toward the outside. U-shaped members C, which include pole pieces 12 and 13, are carried by annular parts 10—11 assembled together to form a magnetic yoke running around the outer cylindrical face of coil A. The branches of said U-shaped members C, which constitute the pole pieces 12, 13, extend along the sides of said coil toward the axis of the device. Every U-shaped member B is disposed between two U-shaped members C along the circumference of coil A, so that the branches of the consecutive members B and C are directed alternately toward the axis and away from said axis.

As shown by Fig. 3, due to the field created by coil A, the pole pieces 1—13 or 2—12 located on the same side of the middle plane of the system (at right angles to the axis thereof) are of alternate polarities as diagrammatically shown on Fig. 3 by letters N and S.

The rotor is essentially constituted by two discs D and E of a magnetic metal, made rigid with each other and disposed respectively on either side of the inductor unit (stator) at small distances from the sides of the pole pieces, these discs being carried by a shaft F which extends through the stator coaxially therewith.

For the sake of clarity, these discs are not shown on Figs. 1, 3 and 5.

As shown by Fig. 3, every line of force of the magnetic field created by coil A passes through a U-shaped member B from one pole piece 1 to the other 2, then from said last mentioned pole piece 2 to the next pole piece 12 located on the same side of coil A through the rotor disc D located on said side of coil A, then through U-shaped member C to the pole piece 13 located opposite said pole piece 2 and finally through the other rotor disc E back to the first mentioned pole piece 1.

On Fig. 3, the path of one line of force has been shown by a line carrying arrows, the portions in solid lines corresponding to the path through the stator magnetic circuit elements and the portions in dotted lines corresponding to the path through the rotor discs D and E and through the air gaps.

Advantageously, the middle portions of the U-shaped members are made sufficiently thick to have the cross section of metal necessary to the passage of the magnetic flux, this thickness being proportional to the flux to be passed therethrough. In particular, as shown by Figs. 3 and 4, concerning U-shaped members B, each of their branches 1 and 2 is given a trapezoidal shape (symmetrical about a radial line) and the middle portion 3 of said U-shaped member is given a rectangular or similar cross section in order to increase the cross section area thereof by a value equal to twice the area of the triangle indicated at 4.

Preferably also, recesses such as 5 (in U-shaped members B) and 6 (in U-shaped members C) are provided in their outer sides. This arrangement makes it possible to concentrate the magnetic flux between the pole pieces and the discs and to avoid leakages between two adjacent pole piece branches.

The construction of a stator according to my invention may be made according to one of the following embodiments.

The U-shaped member C may be carried by a ring 7 of rectangular or similar cross section. Such a ring may have a width substantially equal to that of the base of said U-shaped member, as shown on Fig. 2, or preferably it is of smaller width, as shown by Fig. 3.

In the construction of Figs. 3 and 4, ring 7 may carry, integral therewith, thin rays 8 which connect it with a central sleeve 9 in which are fitted the bearings of the rotor shaft F.

Coil A is mounted on ring 7 and between the branches of pole pieces B.

In order to fix the U-shaped members C on coil A, itself mounted on the inner pole pieces B, I may use an arrangement as shown by Figs. 1–2 and 3–4, according to which each member C is made of two portions, respectively carrying the pole pieces 12 and 13, symmetrical with respect to the middle plane of the stator. All the pole pieces 12, located on the same side are integral with a ring element 10 and all the pole pieces 13, located on the other side with a ring 11 and the two units thus formed are disposed on either side of the coil and then assembled with each other so that the surface of contact of ring elements 10 and 11 with each other is located in said middle plane.

According to another construction illustrated by Figs.

5 and 6, the U-shaped members C are carried by a ring 14 of general circular shape but having portions of greater radius in order to pass around the U-shaped members B. This ring 14 can be slipped over the whole of coil A and U-shaped members B, after which the U-shaped members C are fitted on the intermediate portions of said ring 14, for instance by means of screws 15 (Fig. 6). Preferably, this ring 14 is a cast element made of an amagnetic metal.

Whatever be the construction that is adopted, the two sets of U-shaped members and the ring elements associated therewith are then fixed together, preferably through a device making it possible to fix the whole of the stator to the frame of the apparatus (for instance a vehicle) carrying the part to be braked.

In the construction of Figs. 1, 2, and 3, 4, this assembly is obtained by means of two parts 16 of an amagnetic metal fixed respectively to two diametrally opposed U-shaped members B, by means of bolts 17 (which fix each part 16 to said members B) and of bolts 18 (which fix each part 16 to the ring elements 10—11). In the construction of Figs. 3, 4, said bolts 18 also serve to assemble ring elements 10—11 with each other. Members 16 are provided with holes for fixation of the braking device on the frame of the vehicle to be braked.

In the construction of Figs. 5 and 6, the desired assembly is obtained by providing two diametrally opposed U-shaped members B with bent side plates 19 which are secured to ring 14 through bolts 20 and which include flat portions for fixing the braking device to the vehicle to be braked.

I thus obtain a Foucault current braking device which is particularly advantageous in view of the fact that the amount of matter necessary to constitute it is limited to a minimum.

According to another feature of my invention, the rotor includes the following elements: on the one hand, on either side of the stator, fan blades such as 21 capable, during the rotation of the rotor, of sucking in cooling air between the pole pieces, and on the other hand, on the outside of each discs D, E, above referred to, deflector means capable of directing said air radially toward the outside.

I thus obtain a U circulation of air which is very efficient for practical purposes.

According to a preferred embodiment, the above mentioned discs D and E are carried by said fan blades 21 (Figs. 2 and 6), said blades being themselves carried by a hub 22 fixed on the rotor shaft F.

The deflector means may be constituted, in the construction of Fig. 2 and on the right hand side of Fig. 6, by a light weight disc 23 fixed on the rotor shaft. In the construction disclosed on the left hand side of Fig. 6, such deflector means are constituted by a plate 24 which also acts as coupling element for assembling shaft F to the shaft to be braked. In this case, the corresponding discs (D or E) of the rotor, blades 21 and plate 24 are made to form a single unit, for instance by casting.

The U-shaped air circuits are indicated by arorws on Figs. 2 and 6.

In order to improve cooling, discs D and E may be provided with holes extending therethrough and thus creating secondary U-shaped cooling air circuits, as shown by Fig. 7.

In this case, these holes are made oblique and extend outwardly in the left hand side direction on Fig. 2, so as to produce a fan-like effect, thus improving the cooling action of the holes.

It is further possible to improve cooling by providing on the back face of discs D and E and on blades 21, projections capable of increasing the useful area of the fan.

According to another feature of my invention, the rotor shaft is mounted in a thrust-bearing located at least substantially in the middle plane, or transverse plane of symmetry, of the device.

According to the construction shown by Fig. 6 by way of example, a thrust-bearing 25 is provided, the inner cage of which is held in the inner sleeve 7a rigid with the stator, said bearing being located in the plane of symmetry XY, the whole being arranged in such manner that, in the cold state, the air gaps $e$ and $e_1$ are equal to each other. The other bearings 26 are adapted to permit relative axial displacements of shaft F and sleeve 7a.

Owing to this arrangement, any heating as is produced by the operation of the brake causes equal expansions on either side of the above mentioned plane of symmetry for the shaft F of the rotor (and possibly for the pole pieces carried by the stator). Thus, air gaps $e$ and $e_1$ are always kept equal to each other, in opposition to known braking devices where the thrust-bearing is carried at one end of the braking device, which produces relative variations between the air gaps $e$ and $e_1$ and a lack of balance of the braking device.

In a general manner, while I have, in the above description, disclosed what I deem to be practical and efficient embodiments of my invention, it should be well understood that I do not wish to be limited thereto as there might be changes made in this arrangement, disposition and form of the parts without departing from the principle of the present invention as comprehended within the scope of the accompanying claims.

What I claim is:

1. A Foucault current device for braking a shaft, which comprises, in combination, a stator extending around the axis of said shaft and including at least one annular electric coil coaxial with said shaft and a plurality of U-shaped magnetic circuit members disposed radially with respect to said shaft and having their respective branches, which constitute pole pieces, located on opposite sides of the middle plane of symmetry of said stator which is at right angles to said axis, said U-shaped members having their respective middle portions located alternately on the inside and on the outside of said coil, the pole pieces of two consecutive U-shaped members which are located on the same side of said plane being of opposed polarities, a rotor fixed to said shaft and including two eddy current discs placed in the magnetic field bridging said pole pieces and located respectively on either side of said stator, and a thrust bearing for journalling said shaft in said stator located substantially in said transverse plane of symmetry.

2. A Foucault current device for braking a shaft, which comprises, in combination, a stator extending around the axis of said shaft and including at least one annular electric coil coaxial with said shaft and a plurality of U-shaped magnetic circuit members disposed radially with respect to said shaft and having their respective branches, which constitute pole pieces, located on opposite sides of the middle plane of said stator which is at right angles to said axis, said U-shaped members having their respective middle portions located alternately on the inside and on the outside of said coil, the pole pieces of two consecutive U-shaped members which are located on the same side of said plane being of opposed polarities, and a rotor fixed to said shaft and including two eddy current discs placed in the magnetic field bridging said pole pieces and located respectively on either side of said stator.

3. A Foucault current device for braking a shaft, which comprises, in combination, a stator extending around the axis of said shaft and including at least one annular electric coil coaxial with said shaft and a plurality of U-shaped magnetic circuit members disposed radially with respect to said shaft and having their respective branches, which constitute pole pieces, located on opposite sides of the middle plane of said stator which is at right angles to said axis, said U-shaped members having their respective middle portions located alternately on the inside and on the outside of said coil, the pole pieces of two consecutive U-shaped members which are located on the same side of said plane being of opposed polarities, a rotor fixed to said shaft and including two eddy current annular discs placed in the magnetic field bridging said pole pieces and located respectively on either side of said stator, and fan blades carried by said rotor on the outer faces of said discs for sucking in air radially between said pole pieces and rejecting said air outwardly.

4. A Foucault current device for braking a shaft, which comprises, in combination, a stator extending around the axis of said shaft and including at least one annular electric coil coaxial with said shaft and a plurality of U-shaped magnetic circuit members disposed radially with respect to said shaft and having their respective branches, which constitute pole pieces, located on opposite sides of the middle plane of said stator at right angles to said axis, said U-shaped members having their respective middle portions located alternately on the inside and on the outside of said coil, the pole pieces of two consecutive U-shaped members which are located on the same side of said plane being of opposed polarities, at least one ring element rigid with all of said U-shaped members which have their middle portions located on the inside of said coil, and a rotor fixed to said shaft and including two eddy current discs placed in the magnetic field bridging said pole pieces and located respectively on either side of said stator.

5. A Foucault current device for braking a shaft, which comprises, in combination, a stator extending around the axis of said shaft and including at least one annular electric coil coaxial with said shaft and a plurality of U-shaped magnetic circuit members disposed radially with respect to said shaft and having their respective branches, which constitute pole pieces, located on opposite sides of the middle plane of said stator at right angles to said axis, said U-shaped members having their respective middle portions located alternately on the inside and on the outside of said coil, the pole pieces of two consecutive U-shaped members which are located on the same side of said plane being of opposed polarities, at least one ring element rigid with all of said U-shaped members which have their middle portions located on the inside of said coil, the U-shaped members the middle portions of which are located on the outside of the coil being each formed of two halves each carrying one branch, the two branches of each of said last mentioned pole pieces being of opposed polarities, a common annular support rigid with all of said last mentioned branches which are of the same polarity, the two supports corresponding to the two polarities being juxtaposed at least substantially in the transverse middle plane of said stator, means for securing said two supports to each other, and a rotor fixed to said shaft and including two eddy current discs placed in the magnetic field bridging said pole pieces and located respectively on either side of said stator.

6. A device according to claim 3 further including a ring of sinuous shape adapted to be axially slipped over the portion of the stator including the U-shaped members having their middle portions located on the inside of said coil, and on which the U-shaped members the middle portions of which are located on the outside of said coil are removably fixed.

7. A device according to claim 3 in which the branches of said U-shaped members have a trapezoidal shape the small base of which is turned toward the shaft to be braked.

8. A device according to claim 3 in which the middle portion of every U-shaped member is of a cross section greater than that of the corresponding branches thereof.

9. A device according to claim 3 in which the U-shaped members are each provided on the outside with a recess adjoining the middle portion thereof.

10. A Foucault current device for braking a shaft, this device comprising in combination a stator and a rotor, said rotor being fixed to said shaft, said stator including at least one annular electric coil coaxial with said shaft and a plurality of pole pieces mounted about said coil to create therewith a magnetic field bridging said pole pieces, said rotor including two cylindrical hub elements fixed to said shaft coaxially therewith and extending on opposite sides of said stator respectively, a set of radial plates rigid with each of said hub elements and located in respective planes passing through the axis of said shaft, an annular eddy current disc coaxial with said shaft rigidly carried by each of said sets of radial plates, each of said annular discs being located approximately in a plane at right angles to the axis of said shaft and located between said rotor and the outer end of the hub element carrying the radial plates by which said annular disc is carried, and a plurality of centrifugal fan blades carried radially by each of said annular discs on the outer face thereof, at least some of said fan blades being integral with said radial plates respectively so as to form outward extensions thereof.

11. A Foucault current device for braking a shaft, this device comprising in combination a stator and a rotor, said rotor being fixed to said shaft, said stator including at least one annular electric coil coaxial with said shaft and a plurality of pole pieces mounted about said coil to create therewith a magnetic field bridging said pole pieces, said rotor including two cylindrical hub elements fixed to said shaft coaxially therewith and extending on opposite sides of said stator respectively, a set of radial plates rigid with each of said hub elements and located in respective planes passing through the axis of said shaft, an annular eddy current disc coaxial with said shaft rigidly carried by each of said sets of radial plates, each of said annular discs being located approximately in a plane at right angles to the axis of said shaft and located between said rotor and the outer end of the hub element carrying the radial plates by which said annular disc is carried, a plurality of centrifugal fan blades carried radially by each of said annular discs on the outer face thereof, at least some of said fan blades being integral with said radial plates respectively so as to form outward extensions thereof, and a circular deflector disc fixed to each of said hub elements at the outer end thereof and transverse to said axis shaft to cause the cooling air to flow along the outer faces of said annular discs.

12. A Foucault current device for braking a shaft, this device comprising in combination a stator and a rotor, said rotor being fixed to said shaft, said stator including at least one annular electric coil coaxial with said shaft and a plurality of pole pieces mounted about said coil to create therewith a magnetic field bridging said pole pieces, said rotor including two cylindrical hub elements fixed to said shaft coaxially therewith and extending on opposite sides of said stator respectively, a set of radial plates rigid with each of said hub elements and located in respective planes passing through the axis of said shaft, an annular eddy current disc coaxial with said shaft rigidly carried by each of said sets of radial plates, each of said annular discs being located approximately in a plane at right angles to the axis of said shaft and located between said rotor and the outer end of the hub element carrying the radial plates by which said annular disc is carried, and a plurality of centrifugal fan blades carried radially by each of said annular discs on the outer face thereof, at least some of said fan blades being integral with said radial plates respectively so as to form outward extensions thereof, said annular discs being provided, in the portions thereof opposite said pole piece, with holes extending from one face to the other of each disc.

13. A Foucault current device for braking a shaft, this device comprising in combination a rotor including two eddy current discs fixed to said shaft transversely thereto, said two discs being at a distance from each other, and a stator located at mid-distance between said two eddy current discs and extending around said shaft, said stator including a casing coaxially surrounding said shaft, at least one electric coil and a plurality of pole pieces carried by said casing, said coil and pole pieces being arranged to cooperate together to create a magnetic field extending through said discs to form eddy currents therein when said shaft is rotating, and a thrust bearing for journalling said shaft in said stator, said thrust bearing being fixed in said casing in the middle plane thereof at right angles to said shaft.

References Cited in the file of this patent

UNITED STATES PATENTS

| | | |
|---|---|---|
| 469,862 | Lundell | Mar. 1, 1892 |
| 490,809 | Lundell | Jan. 31, 1893 |
| 2,503,704 | Bessiere | Apr. 11, 1950 |
| 2,745,974 | Oetzel | May 16, 1956 |

FOREIGN PATENTS

| | | |
|---|---|---|
| 1,005,416 | France | Dec. 19, 1951 |
| 1,026,998 | France | Feb. 11, 1953 |